(No Model.)
H. M. HORNE & J. W. ASBELL.
COMBINED PLANTER AND CULTIVATOR.
No. 471,863. Patented Mar. 29, 1892.
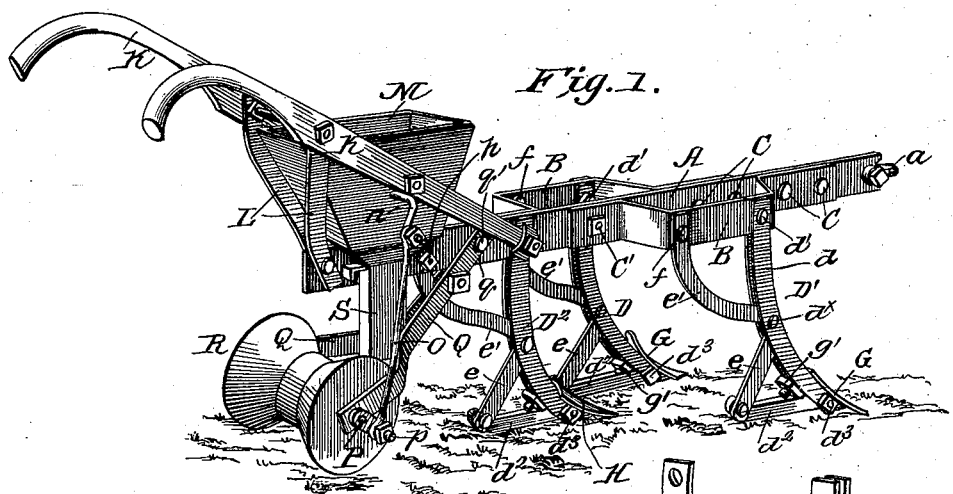
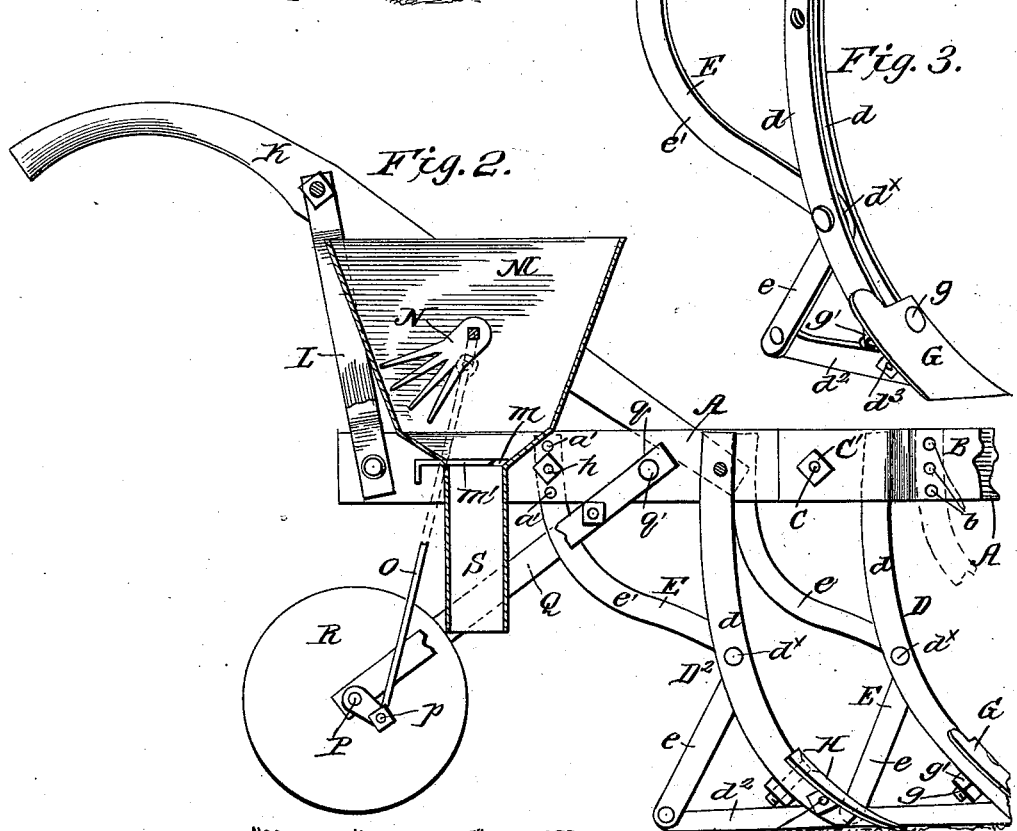
WITNESSES:
Fred G. Dieterich
M. D. Blondel
INVENTORS
H. M. Horne,
J. W. Asbell,
BY Munn & Co.
ATTORNEYS

UNITED STATES PATENT OFFICE.

HENRY M. HORNE AND JOSEPH W. ASBELL, OF ANNIE, GEORGIA.

COMBINED PLANTER AND CULTIVATOR.

SPECIFICATION forming part of Letters Patent No. 471,863, dated March 29, 1892.

Application filed October 15, 1891. Serial No. 408,839. (No model.)

*To all whom it may concern:*

Be it known that we, HENRY M. HORNE and JOSEPH W. ASBELL, residing at Annie, in the county of Lowndes and State of Georgia, have invented certain new and useful Improvements in a Combined Planter and Cultivator, of which the following is a specification.

Our invention has for its object to provide a combined planter and cultivator which is simple in construction, effective for the purpose desired, and in which all the parts constituting the machine are bolted together, whereby the several parts are made interchangeable and adjustable.

With other minor objects in view, and which will hereinafter be apparent, our invention consists in the peculiar combination and novel arrangement of parts, all of which will hereinafter be fully described in the annexed specification, and particularly pointed out in the claim, reference being had to the accompanying drawings, in which—

Figure 1 is a perspective view of our improved planter and cultivator. Fig. 2 is a side view, partly in section, of the rear end thereof. Fig. 3 is a perspective view of one of the plow-standards detached.

In the drawings, A indicates the beam, which may be of wood or iron, preferably of the latter, and of the proportions shown, its forward end being provided with the ordinary clevis-bail $a$.

Upon the beam A are adjustably secured yoke-like members B, projected laterally and in opposite directions and arranged one forward of the other, as shown. These yokes B are secured to the beams by means of the bolts and nuts C C C' C', which are arranged to pass through a series of longitudinally-arranged apertures in the beam and form the supports for the side plows D D', which are secured to the yokes in a manner most clearly understood by reference to Fig. 1, and which plows are each constructed and arranged as most clearly shown in Fig. 3, by reference to which it will be seen that the standard member consists of two parallel curved bars $d\ d$, the upper ends of which lap and are pivotally connected with the forward ends of the yokes B by the bolt and nut $d'$, while their lower ends lap and are secured to the forward ends of the shoes or drag members $d^2$ by means of the nuts and bolts $d^3$.

Each of the plow-standards is braced and rendered adjustable by means of the bars E, each of which is bolted between the members $d$ at $d^\times$ and consists of the downwardly and rearwardly inclined member $e$, the lower end of which is bolted to the rear end of the shoe or drag $d^3$ and an upwardly and rearwardly curved member $e'$, the end of which is arranged to be secured to the rear portion of the yoke B by the bolt and nut $f$, which is adapted to be passed through either one of a series of apertures $b\ b\ b$ in the yoke, as shown. By this construction it will be readily seen that the plow-standards may be quickly adjusted to set the plows for deep or shallow work. The side standards have turning plows G, which are arranged for vertical adjustment thereon by the bolt $g$, which passes between the members $d$ and is held secure by the nut $g'$.

H indicates a cultivator-plow on a central standard $D^2$, which is secured directly to the beam in a manner similar to the standards D D', its rear curved adjusting-bar being secured by the bolt $h$, which passes through one of a series of apertures $a'$ in the beam, as shown.

The handle-bars K K are bolted at their ends to the beam A, as shown, and braced by the diverging arms L L, which arms and the handle-bars serve to support the seed box or hopper M, the feed-opening $m$ of which has an adjustable slide or gate $m'$, as clearly shown in Fig. 2, by reference to which it will also be noticed a stirrer N is held to vibrate in the hopper M, it being formed with a crank-arm $n$, which connects with the upper end of a pitman-rod O, the lower end of which connects with a crank member $p$ on a shaft P, journaled in the lower ends of downwardly and rearwardly projecting diverging arms Q Q, pivotally connectd at $q$ to the beam A and held to be adjustably clamped thereon by the nut and bolt $q'\ q'$.

The shaft P is revolved by means of an adjustable combined ridging roller and coverer R, the adjustment of which is governed by the movement of the arms Q. S indicates a feed-spout, which extends down from the hopper in front of the roller R, as shown.

From the foregoing description, taken in connection with the drawings, the advantages and operation of our improved planter will be readily understood.

It will be seen that the arrangement of the plows and the manner of attaching them are such that the parts are readily detachable or can be adjusted for different kinds of work in a few moments' time.

Having thus described our invention, what we claim as new, and desire to secure by Letters Patent, is—

In a planter and cultivator, the combination of the beam A, the lateral yokes B, the plow-standards D, having rearwardly-extending foot portions $d^2$, the braces E, the handles K, the seed-box M, supported on the handles and provided with a stirrer N, the covering-roller R, and the crank-and-pitman connection between the roller and stirrer, all arranged substantially as shown, and for the purpose described.

HENRY M. HORNE.
J. W. ASBELL.

Witnesses:
D. M. SMITH,
S. F. HARDEE.